United States Patent
Takano

(10) Patent No.: US 11,520,111 B2
(45) Date of Patent: Dec. 6, 2022

(54) FIBER OPTIC CONNECTOR

(71) Applicant: Senko Advanced Components, Inc., Marlborough, MA (US)

(72) Inventor: Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/097,493

(22) Filed: Nov. 13, 2020

(65) Prior Publication Data

US 2021/0141168 A1 May 13, 2021

Related U.S. Application Data

(60) Provisional application No. 62/934,585, filed on Nov. 13, 2019.

(51) Int. Cl.
*G02B 6/38* (2006.01)

(52) U.S. Cl.
CPC ......... *G02B 6/3893* (2013.01); *G02B 6/3818* (2013.01); *G02B 6/3847* (2013.01); *G02B 6/3878* (2013.01); *G02B 6/3885* (2013.01)

(58) Field of Classification Search
CPC .................................................. G02B 6/3847
See application file for complete search history.

(56) References Cited

U.S. PATENT DOCUMENTS

| 987,766 | A | 3/1911 | Spiro |
| 3,721,945 | A | 3/1973 | Hults |
| 4,150,790 | A | 4/1979 | Potter |
| 4,327,964 | A | 5/1982 | Haesly et al. |

(Continued)

FOREIGN PATENT DOCUMENTS

| CA | 2495693 A1 | 4/2004 |
| CN | 2836038 Y | 11/2006 |

(Continued)

OTHER PUBLICATIONS

Arrayed Fiberoptics Corporation, "Non-Contact MPO (MNC) Fiber Connectors" datasheet, Dec. 2018. retrieved via http://docs.arrayedfiberoptics.com/documents/MNC_Connector_Datasheet_2018.pdf (Year: 2018).*

(Continued)

*Primary Examiner* — Michael Stahl

(57) ABSTRACT

A multi-fiber push on (MPO) optical connector includes a housing supporting a ferrule body. The ferrule body forms an optical connection with a second MPO optical connector. The ferrule body includes a connection end having a distal end face arranged to face the second MPO optical connector when the ferrule body forms the optical connection with the second MPO optical connector. The connection end of the ferrule body defines a recess extending proximally into the ferrule body from the distal end face. A plurality of optical fibers are received in the ferrule body. Distal ends of the optical fibers are adjacent to a proximal end of the recess such that the distal ends of the optical fibers are spaced apart from the second MPO optical connector when the ferrule body forms an optical connection with the second MPO optical connector. The distal ends of the optical fibers are coated with an anti-reflective material.

17 Claims, 11 Drawing Sheets

(56) References Cited

U.S. PATENT DOCUMENTS

| | | |
|---|---|---|
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,844,570 A | 7/1989 | Tanabe |
| 4,872,736 A | 10/1989 | Myers et al. |
| 4,979,792 A | 12/1990 | Weber et al. |
| 5,041,025 A | 8/1991 | Haitmanek |
| 5,074,637 A | 12/1991 | Rink |
| D323,143 S | 1/1992 | Ohkura et al. |
| 5,212,752 A | 5/1993 | Stephenson et al. |
| 5,265,181 A | 11/1993 | Chang |
| 5,280,552 A | 1/1994 | Kiyomi et al. |
| 5,289,554 A | 2/1994 | Cubukciyan et al. |
| 5,317,663 A | 5/1994 | Beard et al. |
| 5,335,301 A | 8/1994 | Newman et al. |
| 5,348,487 A | 9/1994 | Marazzi et al. |
| 5,444,806 A | 8/1995 | De Marchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,633,963 A | 5/1997 | Rickenbach et al. |
| 5,684,903 A | 11/1997 | Kyomasu et al. |
| 5,687,268 A | 11/1997 | Stephenson et al. |
| 5,781,681 A | 7/1998 | Manning |
| 5,915,056 A | 6/1999 | Bradley et al. |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,123,463 A * | 9/2000 | Kashihara ............ G02B 6/3821 385/59 |
| 6,134,370 A | 10/2000 | Childers et al. |
| 6,178,283 B1 | 1/2001 | Weigel |
| 6,186,670 B1 | 2/2001 | Austin et al. |
| 6,206,577 B1 | 3/2001 | Hall et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,347,888 B1 | 2/2002 | Puetz |
| 6,416,234 B1 | 7/2002 | Wach et al. |
| 6,461,054 B1 | 10/2002 | Iwase |
| 6,471,412 B1 | 10/2002 | Belenkiy et al. |
| 6,478,472 B1 | 11/2002 | Anderson et al. |
| 6,530,696 B1 | 3/2003 | Ueda et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | Mcdonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,785,460 B2 | 8/2004 | De Jong et al. |
| 6,817,780 B2 | 11/2004 | Ngo |
| 6,854,894 B1 | 2/2005 | Yunker et al. |
| 6,872,039 B2 | 3/2005 | Baus et al. |
| 6,935,789 B2 | 8/2005 | Gross et al. |
| 7,020,376 B1 | 3/2006 | Dang et al. |
| 7,036,993 B2 | 5/2006 | Luther et al. |
| 7,077,576 B2 | 7/2006 | Luther et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,207,724 B2 | 4/2007 | Gurreri |
| D543,146 S | 5/2007 | Chen et al. |
| 7,241,956 B1 | 7/2007 | Stimpson |
| 7,258,493 B2 | 8/2007 | Milette |
| 7,264,402 B2 | 9/2007 | Theuerkom et al. |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,540,666 B2 | 6/2009 | Luther et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,654,748 B2 | 2/2010 | Kuffel et al. |
| 7,695,199 B2 | 4/2010 | Teo et al. |
| 7,699,533 B2 | 4/2010 | Milette |
| 7,785,019 B2 | 8/2010 | Lewallen et al. |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,224,146 B2 | 7/2012 | Hackett |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,534,928 B2 | 9/2013 | Cooke et al. |
| 8,556,520 B2 | 10/2013 | Elenbaas et al. |
| 8,622,634 B2 | 1/2014 | Arnold et al. |
| 8,636,424 B2 | 1/2014 | Kuffel et al. |
| 8,636,425 B2 | 1/2014 | Nhep |
| 8,651,749 B2 | 2/2014 | Jnior et al. |
| 8,678,670 B2 | 2/2014 | Takahashi et al. |
| 8,770,863 B2 | 7/2014 | Cooke et al. |
| 8,855,458 B2 | 10/2014 | Belenkiy et al. |
| 9,239,437 B2 | 1/2016 | Belenkiy et al. |
| 9,383,539 B2 | 7/2016 | Hill et al. |
| 9,618,702 B2 | 4/2017 | Takano et al. |
| 9,618,703 B2 | 4/2017 | Iizumi et al. |
| 9,658,409 B2 | 5/2017 | Gniadek et al. |
| 9,772,457 B2 | 9/2017 | Hill et al. |
| 9,798,090 B2 | 9/2017 | Takano et al. |
| 9,778,090 B2 | 10/2017 | Hirt |
| 9,778,425 B2 | 10/2017 | Nguyen et al. |
| 9,798,094 B2 | 10/2017 | Kuffel et al. |
| 9,933,582 B1 | 4/2018 | Lin |
| 9,939,589 B2 | 4/2018 | Takano et al. |
| 9,977,199 B2 | 5/2018 | Chang et al. |
| 2001/0010741 A1 | 8/2001 | Hizuka |
| 2002/0191919 A1 | 12/2002 | Nolan |
| 2003/0007739 A1 | 1/2003 | Perry et al. |
| 2003/0053787 A1 | 3/2003 | Lee |
| 2003/0063867 A1 | 4/2003 | Mcdonald et al. |
| 2003/0147598 A1 | 8/2003 | Mcphee et al. |
| 2003/0156796 A1 | 8/2003 | Rathnam et al. |
| 2003/0161586 A1 | 8/2003 | Hirabayashi |
| 2004/0047566 A1 | 3/2004 | Mcdonald et al. |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2004/0264873 A1 | 12/2004 | Smith et al. |
| 2005/0111796 A1 | 5/2005 | Matasek et al. |

(56) References Cited

U.S. PATENT DOCUMENTS

| | | |
|---|---|---|
| 2005/0141817 A1 | 6/2005 | Yazaki et al. |
| 2005/0213897 A1 | 9/2005 | Palmer et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0025665 A1 | 2/2007 | Dean et al. |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0026647 A1 | 1/2008 | Boehnlein et al. |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0022457 A1 | 1/2009 | De Jong et al. |
| 2009/0028507 A1 | 1/2009 | Jones et al. |
| 2009/0148101 A1 | 6/2009 | Lu et al. |
| 2009/0196555 A1 | 8/2009 | Lin et al. |
| 2009/0214162 A1 | 8/2009 | O'Riorden et al. |
| 2009/0220197 A1 | 9/2009 | Gniadek et al. |
| 2009/0226140 A1 | 9/2009 | Belenkiy et al. |
| 2009/0269014 A1 | 10/2009 | Winberg et al. |
| 2010/0034502 A1 | 2/2010 | Lu et al. |
| 2010/0092136 A1 | 4/2010 | Nhep |
| 2010/0129031 A1 | 5/2010 | Danley et al. |
| 2010/0215322 A1 | 8/2010 | Matsumoto et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0081119 A1 | 4/2011 | Togami et al. |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0128305 A1 | 5/2012 | Cooke et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0163930 A1* | 6/2013 | Jian .................. G02B 6/36 385/60 |
| 2013/0170797 A1 | 7/2013 | Ott |
| 2013/0183012 A1 | 7/2013 | Cabanne Lopez et al. |
| 2013/0216185 A1 | 8/2013 | Klavuhn et al. |
| 2013/0322825 A1 | 12/2013 | Cooke et al. |
| 2014/0016901 A1 | 1/2014 | Lambourn et al. |
| 2014/0023322 A1 | 1/2014 | Gniadek |
| 2014/0050446 A1 | 2/2014 | Chang |
| 2014/0133808 A1 | 5/2014 | Hill et al. |
| 2014/0334780 A1 | 11/2014 | Nguyen et al. |
| 2014/0348477 A1 | 11/2014 | Chang |
| 2015/0023646 A1 | 1/2015 | Belenkiy et al. |
| 2015/0078717 A1 | 3/2015 | Lin |
| 2015/0117467 A1 | 4/2015 | Leung |
| 2015/0241642 A1 | 8/2015 | Hikosaka |
| 2015/0355417 A1 | 12/2015 | Takano et al. |
| 2015/0378113 A1 | 12/2015 | Good et al. |
| 2016/0041349 A1 | 2/2016 | Pimpinella |
| 2016/0259135 A1 | 9/2016 | Gniadek et al. |
| 2017/0091671 A1 | 3/2017 | Mitarai |
| 2017/0254966 A1 | 9/2017 | Gniadek et al. |
| 2017/0285277 A1 | 10/2017 | Chang et al. |
| 2018/0011261 A1 | 1/2018 | Hill et al. |
| 2018/0284360 A1 | 10/2018 | Diao et al. |
| 2021/0141165 A1* | 5/2021 | Guo ............... G02B 6/3818 |

FOREIGN PATENT DOCUMENTS

| | | | |
|---|---|---|---|
| CN | 201383588 Y | | 1/2010 |
| CN | 108205177 A | * | 6/2018 |
| CN | 207718020 U | * | 8/2018 |
| DE | 19901473 A1 | | 7/2000 |
| DE | 202006011910 U1 | | 4/2007 |
| DE | 102006019335 A1 | | 10/2007 |
| EP | 1072915 A2 | | 1/2001 |
| EP | 1074868 A1 | | 2/2001 |
| EP | 1211537 A2 | | 6/2002 |
| EP | 1245980 A2 | | 10/2002 |
| EP | 1566674 A1 | | 8/2005 |
| GB | 2111240 A | | 6/1983 |
| JP | 2009229545 A | | 10/2009 |
| JP | 2009276493 A | | 11/2009 |
| TW | 200821653 A | | 5/2008 |
| WO | 0179904 A2 | | 10/2001 |
| WO | 2004027485 A1 | | 4/2004 |
| WO | 2008112986 A1 | | 9/2008 |
| WO | 2009135787 A1 | | 11/2009 |
| WO | 2010024851 A2 | | 3/2010 |
| WO | 2012136702 A1 | | 10/2012 |
| WO | 2012162385 A1 | | 11/2012 |
| WO | 2013052070 A1 | | 4/2013 |
| WO | 2013179197 A1 | | 12/2013 |
| WO | 2014028527 A2 | | 2/2014 |
| WO | 2014182351 A1 | | 11/2014 |

OTHER PUBLICATIONS

International Search Report and Written Opinion, Application No. PCT/US20/060534, dated Feb. 8, 2021, pp. 9.

"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite—rtn—binary.pdf%3Fbinaryid%3D8DBC7DE2EB72D315%26binarytype%3D48403DAA363AEB7E&ei=ZvevTujWH4ntrAfH-dXZCg&usg=AFQjCNE1MdC-4avewRJU6IDVc—WYbr0QQ.

"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/KatalogGlenair-LWL1110.pdf.

"Fiber Optic Products Catalog" Nov. 2007, Tyco Electronics Corporation, Harrisburg, Pennsylvania, www.ampnetconnect.com/documents/Fiber%20Optics%20Catalog%201107.pdf.

ARK Communication Co., Ltd., SC/LC/FC/ST/MU/D4/DIN Fiber Optic Connectors, Oct. 21, 2014, Shenzhen, China, https://web.archive.org/web/20141021222819/http://www.ark-opitical.com/product-1-1-optic-fiber-connector-en/14296.

Non-Contact MPO (MNC tm) Fiber Connectors, Arrayed Fiberoptics, Dec. 17, 2018, 1 page.

* cited by examiner

FIBER OPTIC CONNECTOR

CROSS-REFERENCE TO RELATED APPLICATION

This application claims priority to U.S. Provisional App. No. 62/934,585, filed Nov. 13, 2019, the entirety of which is hereby incorporated by reference.

FIELD

The present disclosure generally relates to fiber optic connectors, and, more specifically, to a multi-fiber push on (MPO) optical connector.

BACKGROUND

Optical connectors are used within optical communication networks to interconnect optical cables to optical devices or other optical cables. Optical connections typically involve two optical connectors connected together to form an optical connection. One type of optical connector is a multi-fiber push on (MPO) optical connector. An MPO optical connector is used to connect multiple optical fibers together.

SUMMARY

In one aspect, a multi-fiber push on (MPO) optical connector comprises a housing. A ferrule body is supported by the housing. The ferrule body is configured to form an optical connection with a second MPO optical connector. The ferrule body includes a connection end having a distal end face arranged to face the second MPO optical connector when the ferrule body forms the optical connection with the second MPO optical connector. The connection end of the ferrule body defines a recess extending proximally into the ferrule body from the distal end face. A plurality of optical fibers are received in the ferrule body. Distal ends of the optical fibers are disposed adjacent to a proximal end of the recess such that the distal ends of the optical fibers are spaced apart from the second MPO optical connector when the ferrule body forms an optical connection with the second MPO optical connector.

In another aspect, a multi-fiber push on (MPO) optical connector assembly comprises a first MPO optical connector. The first MPO optical connector has a first ferrule body with a first end face and two pins extending from the first end face. The first MPO optical connector includes a first set of optical fibers received in the first ferrule body. A second MPO optical connector has a second ferrule body with a second end face. The second MPO optical connector includes two guide channels configured to accept the two pins when the first and second MPO optical connectors are coupled together. The second MPO optical connector includes a second set of optical fibers received in the second ferrule body. At least one of the first ferrule body or the second ferrule body defines a recess extending inward from the corresponding first or second end face such that facing end portions of the first and second sets of optical fibers are spaced apart from one another when the first and second MPO optical connectors are coupled together to form an optical connection between the first and second optical fibers.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
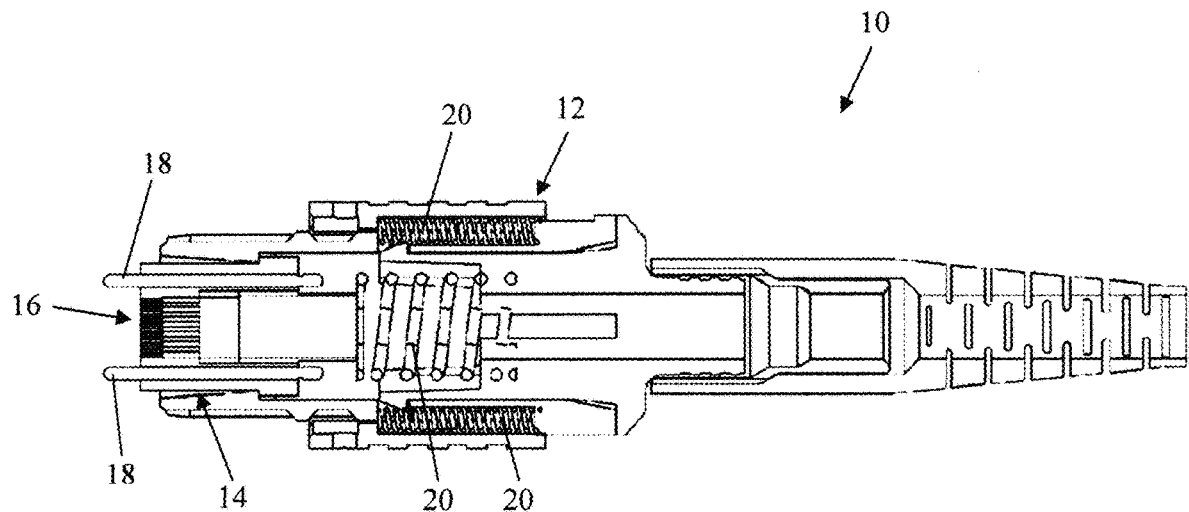
FIG. 1 is a longitudinal section of a prior art male MPO optical connector.
Figure 2:
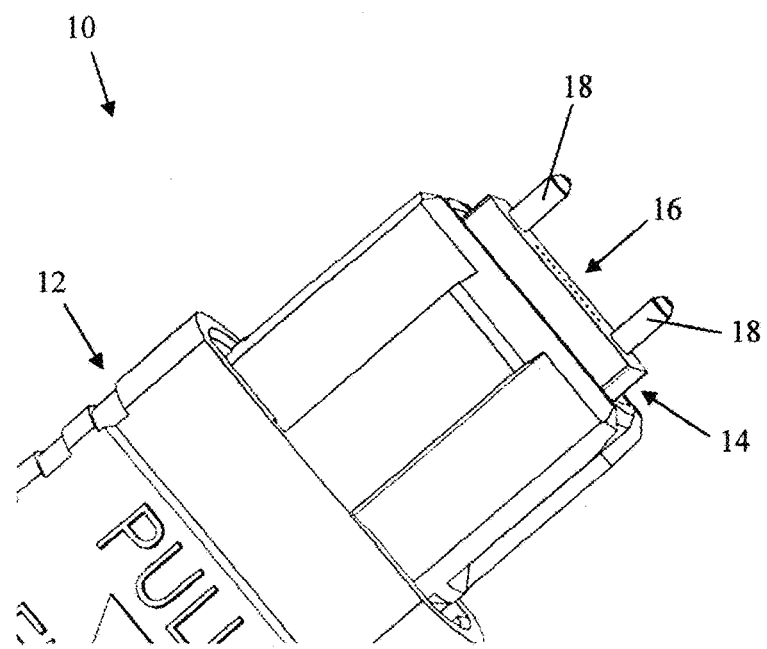
FIG. 2 is an enlarged, fragmentary perspective of a distal end of the male MPO optical connector of FIG. 1.

Referring to FIGS. 1 and 2, a prior art male multi-fiber push on (MPO) optical connector 10 is generally shown. The male MPO optical connector 10 includes a housing 12 supporting a ferrule body 14. The ferrule body 14 is at (e.g., defines) the distal end of the male MPO optical connector 10. The ferrule body 14 is configured to form an optical connection with another (e.g., second) MPO optical connector. The ferrule body 14 has a distal end face 16 that engages the second MPO optical connector for forming the optical connection. The end face 16 is generally continuous and planar. The ferrule body 14 is a male ferrule body and includes two mechanical transfer pins 18. The pins 18 extend distally from the end face 16. The pins 18 mate with the second (e.g., female) MPO optical connector for forming a mechanical transfer (MT) connection with the second MPO optical connector. The male MPO optical connector 10 includes one or more springs 20 for distally biasing the ferrule body 14 toward and into engagement with the second MPO optical connector to help maintain the fiber optic connection between the two optical connectors. The male MPO optical connector 10 (e.g., ferrule body 14) is connected to a fiber optic cable (not shown). The optical fibers (not shown) of the fiber optic cable are attached to the ferrule body 14, with ends (e.g., distal ends) of the optical fibers disposed adjacent to or at the end face 16. The ends of the optical fibers receive and/or transmit optical (e.g., light) signals to and/or from the second MPO optical connector. As used herein, "optical fiber" may include multiple fibers spliced together or a single continuous fiber.

Figure 3:
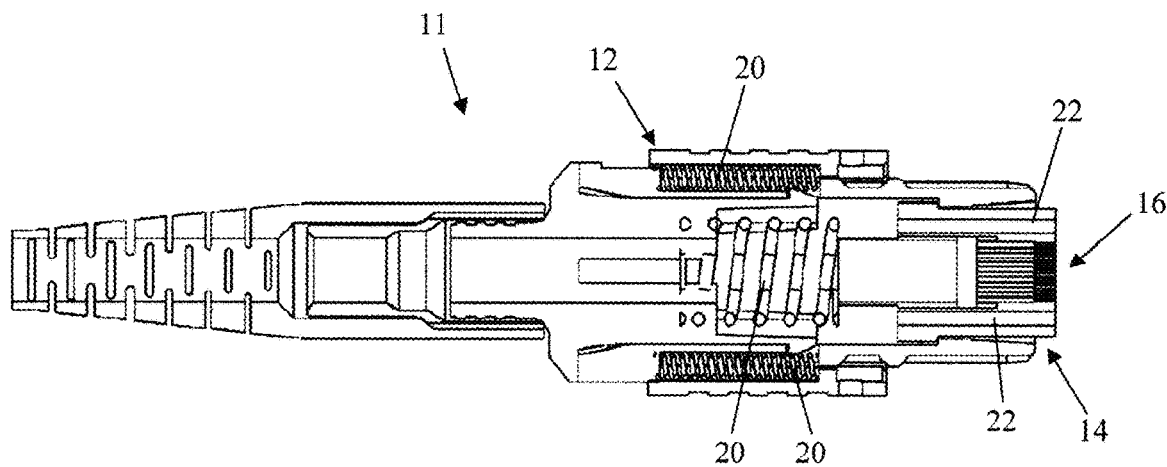
FIG. 3 is a longitudinal section of a prior art female MPO optical connector.
Figure 4:
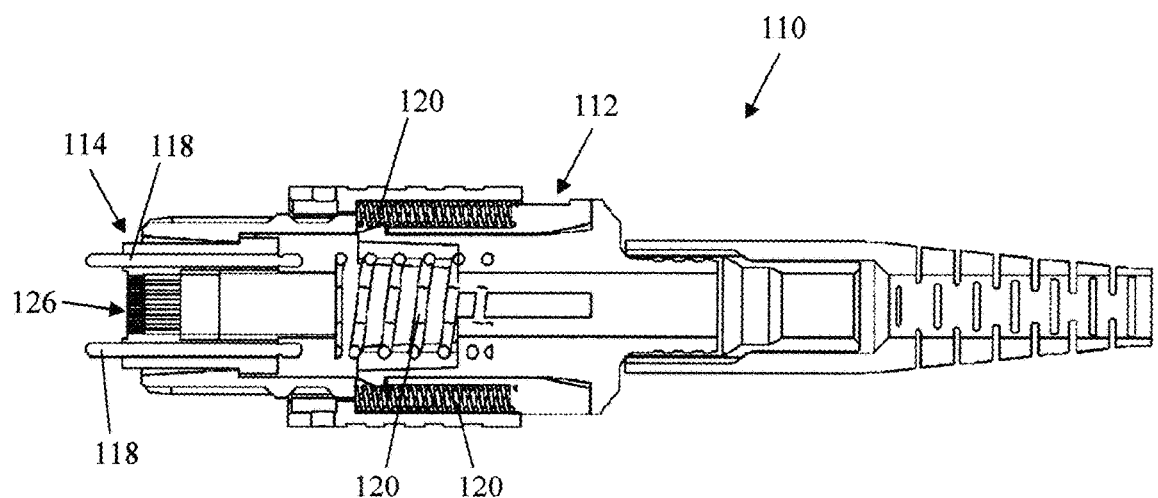
FIG. 4 is a longitudinal section of a male MPO optical connector according to one embodiment of the present disclosure.
Figure 5:
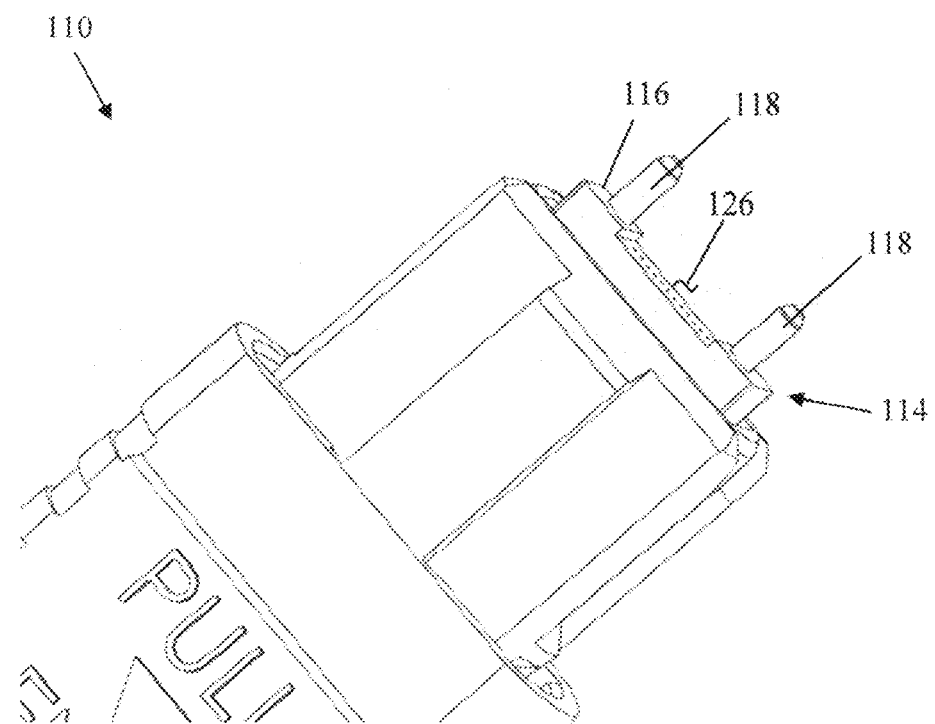
FIG. 5 is an enlarged, fragmentary perspective of a distal end of the MPO optical connector of FIG. 4.

Referring to FIG. 3, a prior art female multi-fiber push on (MPO) optical connector 11 is generally shown. The female MPO optical connector 11 can be connected to the male MPO optical connector 10. The female MPO optical connector 11 is generally the same as the male MPO optical connector 10 and, thus, corresponding or identical parts have identical reference numerals. The ferrule body 14 of the female MPO optical connector 11 includes two guide channels 22 with open ends at the end face 16 for receiving the pins 18 of the male MPO optical connector 10.

Figure 8:
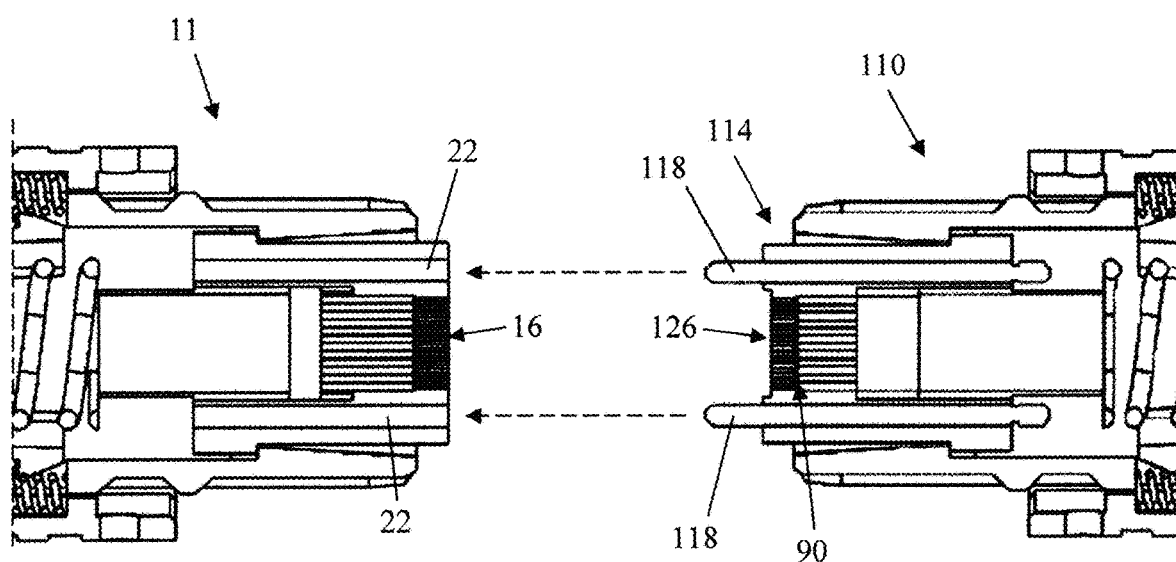
FIG. 8 is an enlarged, fragmentary section of the male MPO optical connector of FIG. 4 being connected to the female MPO optical connector of FIG. 3.

Referring to FIGS. 4-8, a male multi-fiber push on (MPO) optical connector according to one embodiment of the present disclosure is generally indicated at reference numeral 110. The MPO optical connector 110 (e.g., a first MPO optical connector) forms a fiber optic connection with a second MPO optical connector, such as the female MPO optical connector 11 (FIG. 8). When coupled together, the MPO optical connectors 110, 11 form an optical connection (e.g., a fiber optic connection) that enables communication between different components (e.g., cables, devices, etc.) in an optical communications network. The MPO optical connector 110 is attached to the end of a fiber optic cable 88 (FIG. 7), such as a ribbon cable, having a plurality of optical fibers 90 (e.g., a set of optical fibers). In the illustrated embodiment, the MPO optical connector 110 is a male MPO optical connector configured to mate with (e.g., be inserted in) a female MPO optical connector, such as female MPO optical connector 11. Other configurations of the MPO optical connector 110 are within the scope of the present disclosure. For example, the MPO optical connector 110 can be a female MPO optical connector, as discussed in more detail below, configured to mate (e.g., receive) a male MPO optical connector. In another example, the connector could make electrical or other types of connections instead of or in addition to an optical connection. It is understood the MPO optical connector 110 may be coupled to other devices, such as optical adapters, besides just other MPO optical connectors. Furthermore, it is understood the teaching set forth herein may be applied to other types of optical connectors besides MPO optical connectors.

The MPO optical connector 110 includes a housing 112 supporting a ferrule body 114. The ferrule body 114 is at (e.g., defines) the distal end of the MPO optical connector 110. The ferrule body 114 is configured to form the optical connection with the second MPO optical connector, such as the female MPO optical connector 11. The plurality of optical fibers 90 (FIG. 6) of the fiber optic cable 88 are attached to (e.g., received in) the ferrule body 114. The ferrule body includes a connection end 124 (FIG. 6) having an end face (e.g., distal end face) 116. The end face 116 is arranged to face the second MPO optical connector when the ferrule body forms the optical connection with the second MPO optical connector (FIG. 8). The end face 116 that engages the second MPO optical connector 11 (e.g., end face 16) to form the optical connection when the first MPO optical connector 110 is coupled to the second MPO optical connector. The end face 116 is generally planar. The ferrule body 114 is a male ferrule body and includes two pins 118 (e.g., mechanical transfer pins). The pins 118 extend distally from the end face 116. The pins 118 mate with the second (e.g., female) MPO optical connector for forming the mechanical transfer (MT) connection with the second MPO optical connector. For example, the pins 118 are received in the channels 22 of the female MPO optical connector 11. The MPO optical connector 110 may also include one or more springs 120 for distally biasing the ferrule body 114 toward and into engagement with the second MPO optical connector to help maintain the fiber optic connection between the two optical connectors. Other configurations of the MPO optical connector 110 are within the scope of the present disclosure.

The connection end 124 of the ferrule body 114 defines a recess 126. The recess 126 extends proximally or inwardly into the ferrule body 114 from the end face 116. The recess 126 extends proximally to a proximal end 130. The proximal end is generally planar. Preferably, the proximal end 130 is disposed at an angle α (FIG. 12) to an imaginary line that is perpendicular to a longitudinal axis of each connector. The connection end 124 of ferrule body 114 has a central region 132 and opposite side regions 134. The central region 132 is defined by the recess 126. The side regions 134 protrude distally of (e.g., from) the central region 132 and define the end face 116. The side regions 134 are positioned to engage an end face (e.g., end face 16) of the second MPO optical connector to space the end face of the second MPO optical connector from the central region 132 of the connection end 124 of the ferrule body 114. In this embodiment, the recess 126 is disposed between the pins 118. The pins 118 project distally from the side regions 134.

The recess 126 spaces apart the optical fibers 90 from the second MPO optical connector 11 the MPO optical connector 110 forms an optical connection with. The distal ends (e.g., facing ends, facing end portions) of the optical fibers 90 are disposed adjacent to, or more preferably at, the proximal end 130 of the recess 126. Due to this arrangement, the distal ends of the optical fibers 90 are spaced apart from the second MPO optical connector when the ferrule body 114 (broadly, the MPO optical connector 110) forms the optical connection with the second MPO optical connector 11. In particular, the side regions 134 are (e.g., end face 116 is) positioned to engage an end face of the second MPO optical connector (e.g., the end face 16 of the female MPO optical connector 11) to space the end face of the second MPO optical connector from the central region 132 of the connection end 124 of the ferrule body 114. By spacing apart the distal ends of the optical fibers 90 from the second MPO optical connector, the direct fiber-to-fiber contact of the optical fibers, present when conventional MPO optical connectors 10, 11 are coupled together, is eliminated. This provides numerous benefits and advantages. For example, it is easier to clean the distal ends of the optical fibers 90 in the MPO optical connector 110 of the present disclosure over conventional MPO optical connectors 10, 11. In conventional MPO optical connectors 10, 11, the connection between the connectors compresses any dirt and debris on the end face 16 and/or distal ends of the optical fibers which makes it difficult to clean and remove the dirt and debris. Moreover, by preventing direct fiber-to-fiber contact, the risk of damaging the optical fibers 90 due to the compressive forces is reduced, if not eliminated. Furthermore, because the optical connection does not rely on the spring forces to maintain the direct fiber-to-fiber contact, the overall force of the spring can be reduced—making it easier to couple the MPO optical connectors 110 together.

Figure 6:
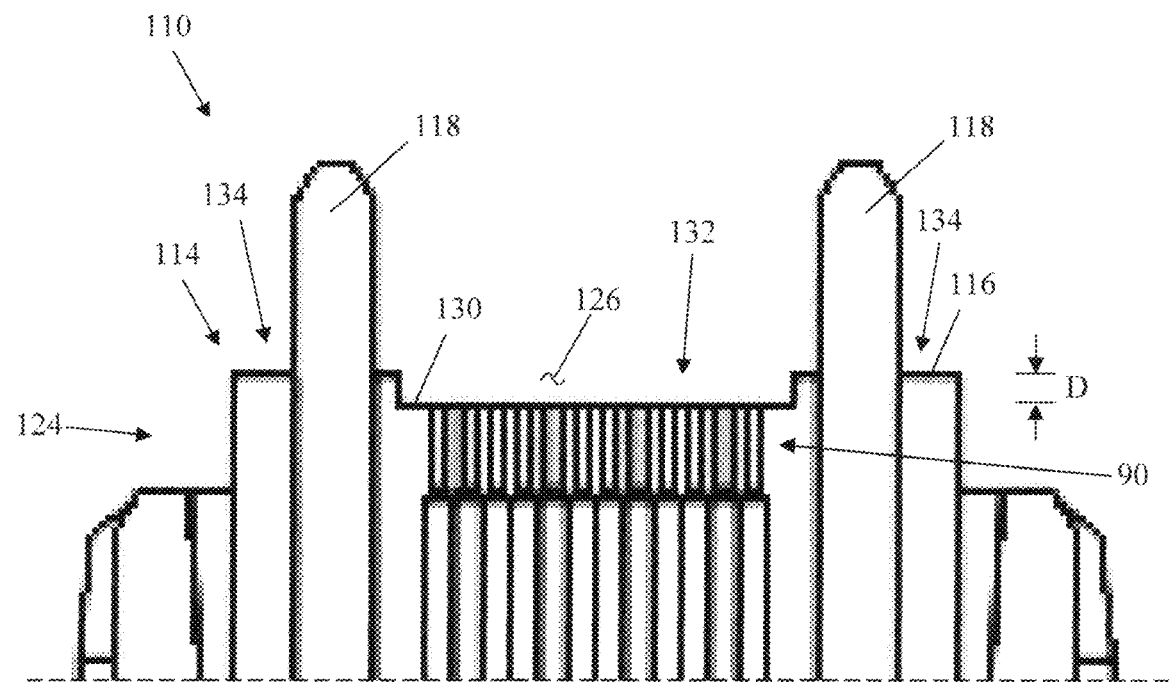
FIG. 6 is an enlarged, fragmentary section of the distal end thereof.
Figure 7:
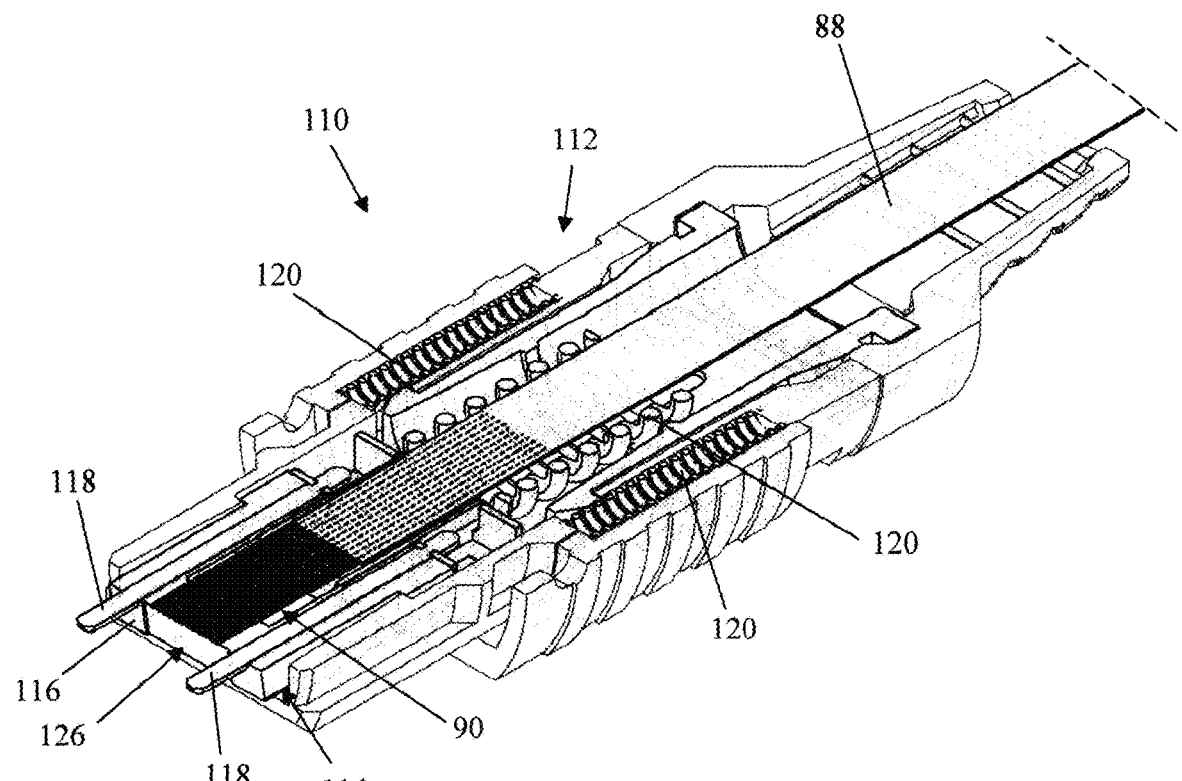
FIG. 7 is a horizontal section of the MPO optical connector of FIG. 4, shown in perspective.

By spacing apart the distal end of the optical fibers 90 of the MPO optical connector 110 from the second MPO optical connector, the quality of the optical connection between the optical fibers is reduced due to insertion loss and/or reflection (e.g., reflection loss). The recess 126 has a depth D configured to reduce the effect of at least one of insertion loss or reflection. Preferably, the depth D of the recess 126 reduces the effect of both insertion loss and reflection. The depth D of the recess 126 extends from the end face 116 to the proximal end 130 of the recess (FIG. 6). Preferably, the depth D of the recess 126 is less than about 20 microns, or more preferably, less than about 15 microns. In one embodiment, the depth D (e.g., the distance between optical fibers) of the recess 126 is within the inclusive range of about 8 microns to about 15 microns, which corresponds to an insertion loss in the inclusive range of about 0.5 dB to about 1.0 dB. As required by industry the mating loss is in the range of about 0.5 dB to about −1.0 dB. In one embodiment, the depth D of the recess 126 is about 11 microns +/−3 microns. To further reduce the signal losses, the MPO optical connector 110 preferably includes an anti-reflective material coating the distal ends or end face of the optical fibers 90. The anti-reflective material is configured to correspond to a refractive index of a gap media (not shown) disposed between the distal end of the optical fibers and the second MPO optical connector. Specifically, a refractive index of the anti-reflective material is preferably less than the refractive index of the gap media. The gap media may comprise air, gel or water. Due to Fresnel reflection, as light passes from air through an uncoated fiber optic glass or from uncoated fiber optic glass into an air gap, such as formed by mating two opposing fiber optic connectors, as described herein, up to four (4) percent of the light, which is optical power and thus data signal, can be lost. As light reflection increases date throughput decreases. Anti-reflective coatings are used to help reduce light or power loss due to reflection.

Figure 12:
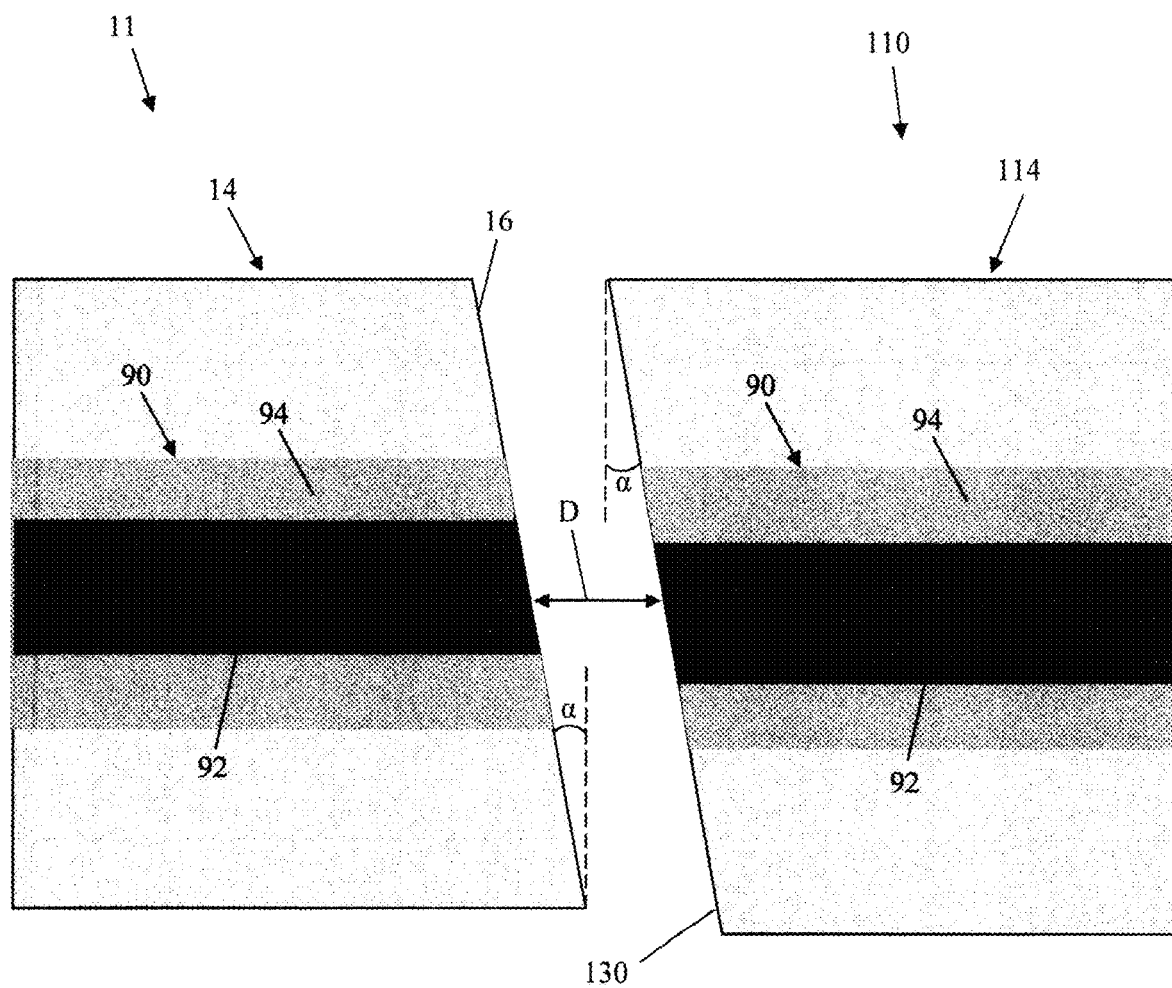
FIG. 12 is a schematic diagram of two MPO optical connectors.
Figure 13:
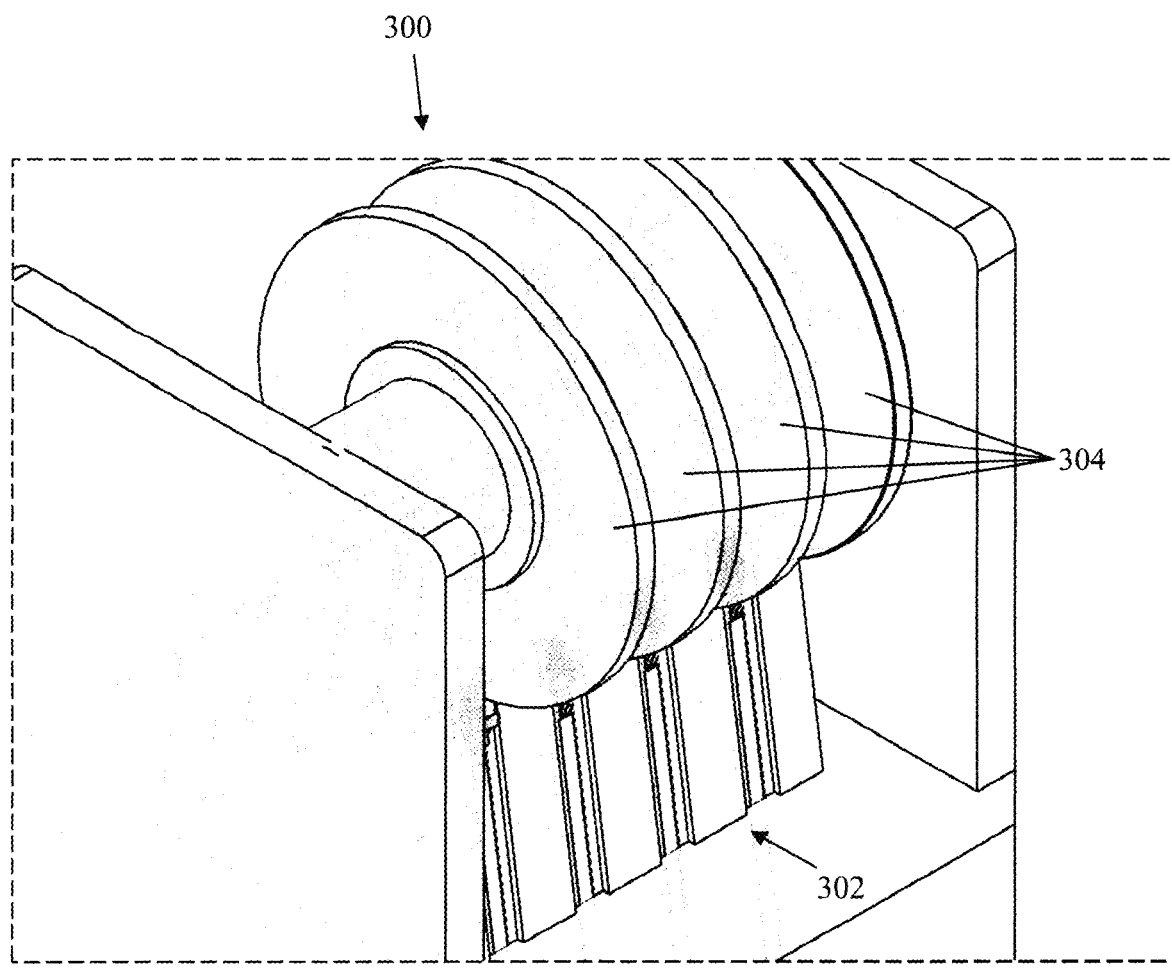
FIG. 13 is a perspective of a grinder and a grinding jig for forming a recess in an MPO optical connector.
Figure 14:
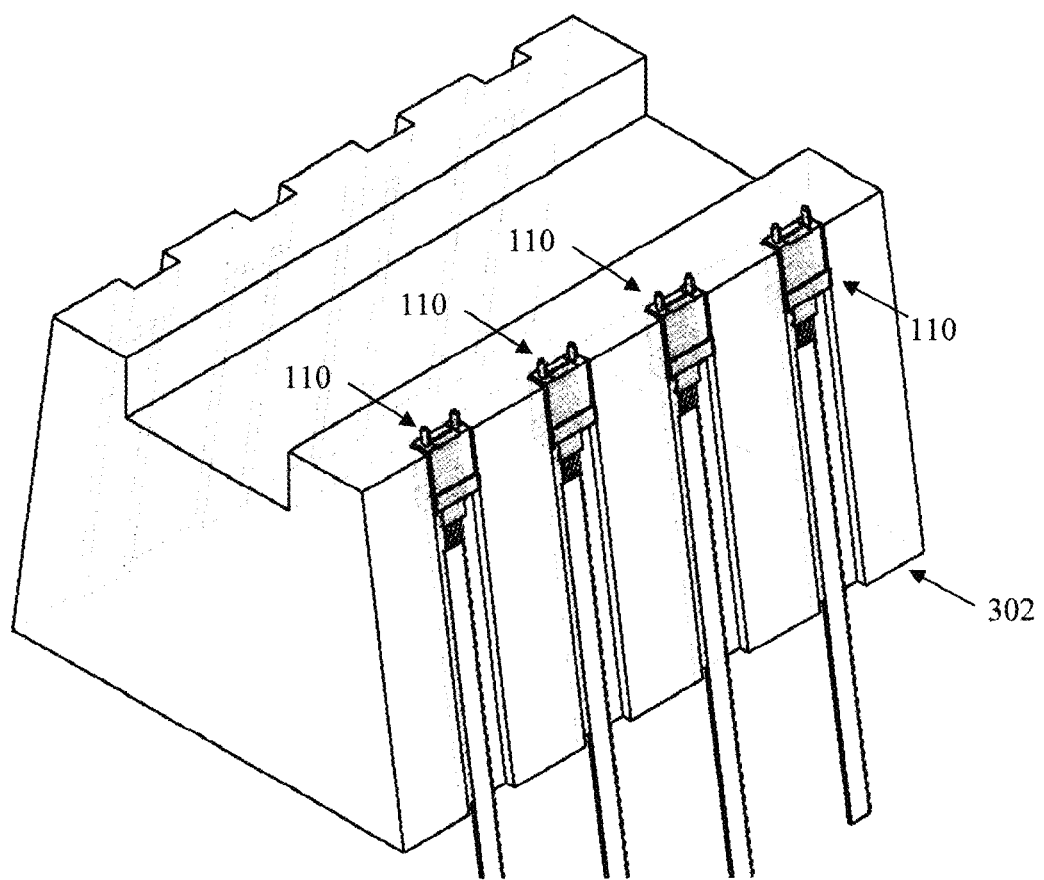
FIG. 14 is a perspective of the grinding jig.

Referring to FIG. 12, a schematic diagram of ferrule bodies of coupled MPO optical connectors according to the present disclosure is generally shown. For the purpose of this diagram, the MPO optical connector 110 is coupled to the female MPO optical connector 11 (see FIG. 8). The optical fibers 90 are shown schematically with a core 92 and a cladding 94 surrounding the core. The end face 16 of the female MPO optical connector 11 and the proximal end 130 of the recess 126 of the MPO optical connector 110 extend at an angle α to an imaginary line that is perpendicular to a longitudinal axis of each connector. The insertion loss due to the depth D of the recess 126 (e.g., the distance between the optical fibers 90) can be calculated using the following formula:

$$IL = -10\log\left[1 - \frac{D\left(\left(n_1^2 - n_2^2\right)^2\right)}{4a * n_0}\right]$$

Where IL is the insertion loss, D is the depth of the recess 126 (e.g., the distance between the optical fibers), a is the radius of the core 92 of the optical fiber 90, $n_0$ is the refractive index of the gap medium, $n_1$ is the refractive index of the core 92 of the optical fiber with a coating, and $n_2$ is the refractive index of the cladding 94 of the optical fiber, at the first interface.

The reflection loss or return loss is the amount of power reflected back to the power source, and correlates to insertion loss. A discontinuity in the link increases return loss, such as the interconnect between two fiber optic connectors. Depth D of the recess 126 (e.g., the distance between the optical fibers) creates a discontinuity. Return loss can be calculated using the following formula with measured values of Pincident and Preflected using an optical power meter:

$$RL = -10\log\left[\frac{Pincident}{Preflected}\right]$$

Figure 9:
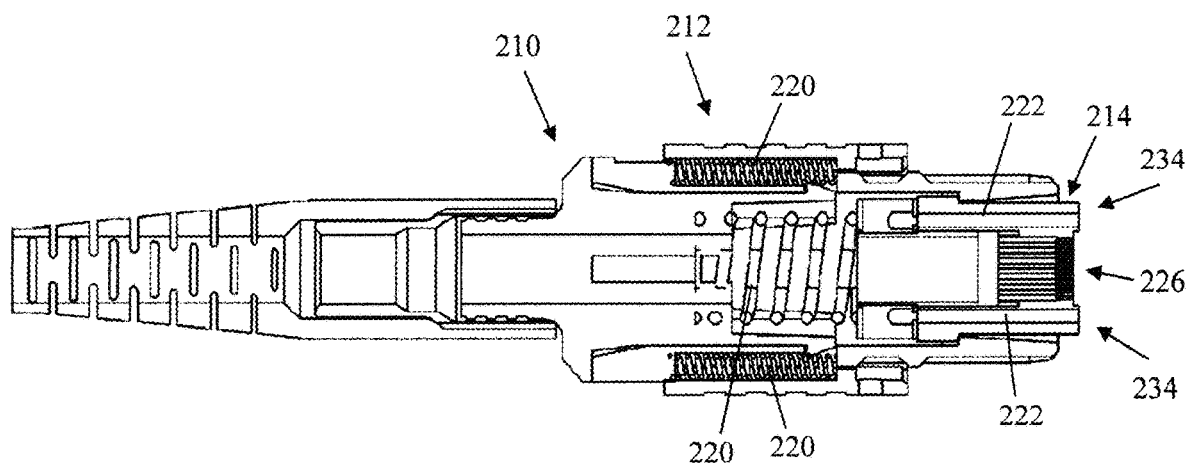
FIG. 9 is a longitudinal section of a female MPO optical connector according to another embodiment of the present disclosure.
Figure 10:
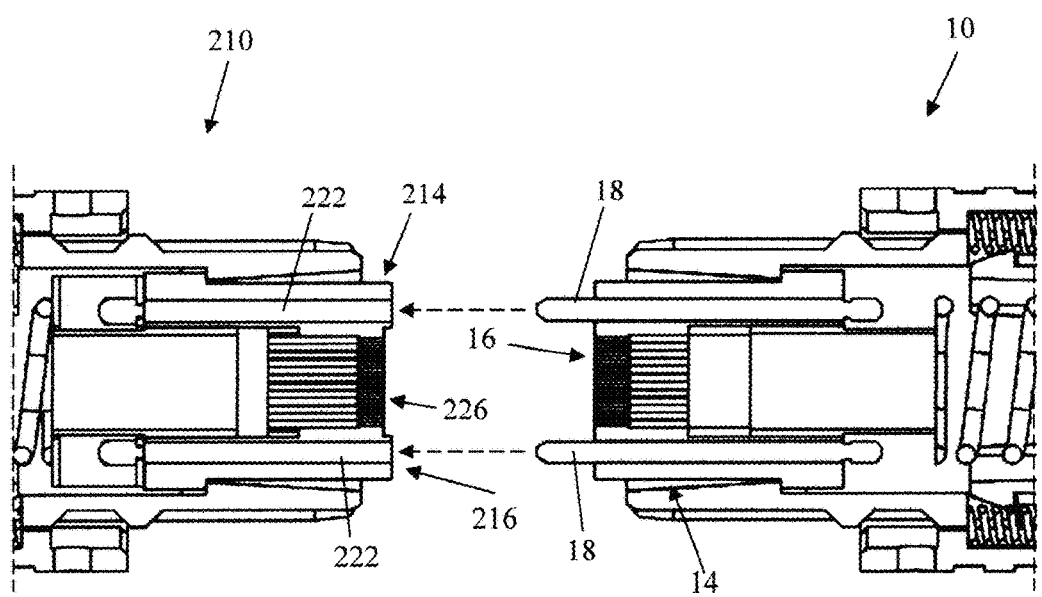
FIG. 10 is a longitudinal section of the MPO optical connector of FIG. 9 being connected to the male MPO optical connector of FIG. 1.

Referring to FIGS. 9 and 10, another embodiment of a MPO optical connector according to the present disclosure is generally indicated by reference numeral 210. MPO optical connector 210 is generally analogous to MPO optical connector 110 and, thus, for ease of comprehension, where similar, analogous or identical parts are used, reference numerals "100" units higher are employed. Accordingly, unless clearly stated or indicated otherwise, the above descriptions regarding MPO optical connector 110 also apply to MPO optical connector 210.

The MPO optical connector 210 is a female MPO optical connector that mates with a male (e.g., second) MPO optical connector, such as male MPO optical connector 10 (FIG. 10). Accordingly, the ferrule body 214 is a female ferrule body that includes (e.g., defines) guide channels 222. The guide channels 222 have open ends at the end face 216 for receiving or accepting the pins 18, 118 of the male MPO optical connector 10, 110. By receiving the pins 18, 118 of the second MPO optical connector 10, 110, a mechanical transfer connection is established between the two connectors. In this embodiment, the guide channels 222 are disposed in the side regions 234. The guide channels 222 have channel openings at the side regions 234 (e.g., end face 216) of the ferrule body 214, with the guide channels extending proximally into the ferrule body. The recess 226 is disposed between the guide channels 222.

Figure 11:
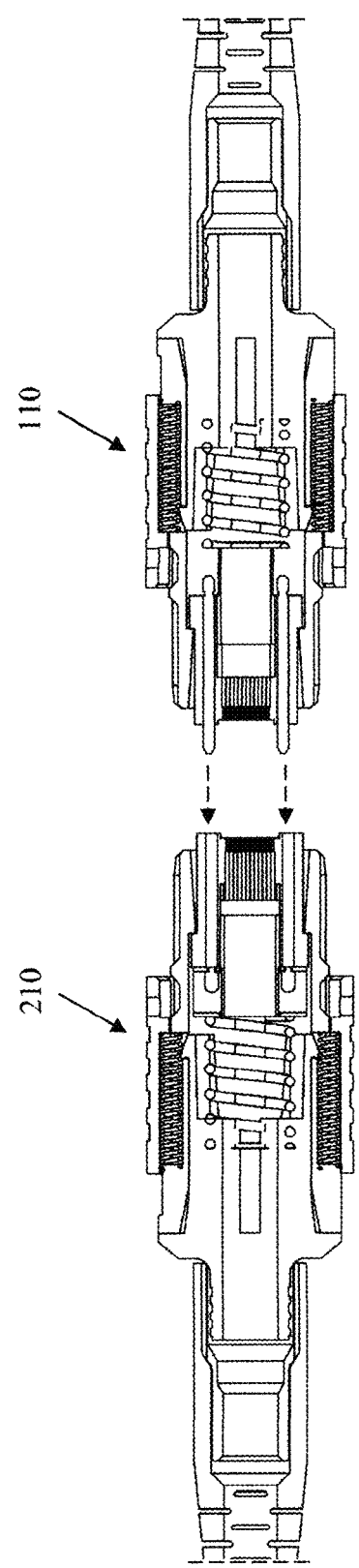
FIG. 11 is a cross section of the MPO optical connectors of FIGS. 4 and 9 being connected together.

Referring to FIGS. 8, 10 and 11, the MPO optical connectors 110, 210 of the present disclosure can be connected to each other or to conventional MPO optical connectors 10, 11. For example, the male MPO optical connector 110 of the present disclosure can be connected to the female MPO optical connector 210 of the present disclosure (FIG. 11) or a conventional female MPO optical connector 11 (FIG. 8). Likewise, the female MPO optical connector 210 of the present disclosure can be connected to the male MPO optical connector 110 of the present disclosure (FIG. 11) or a conventional male MPO optical connector 10 (FIG. 10). Broadly, only one of the two MPO optical connectors 10, 11, 110, 210 that form the optical connection needs to be one of the MPO optical connectors 110, 210 of the present disclosure in order to obtain the benefits of the recess 126, 226 described above. In other words, at least one of the MPO optical connectors 110, 210 (e.g., ferrule bodies 114, 214) forming the optical connection includes (e.g., defines) the recess 126, 226. This way, when the two MPO optical connectors 10, 11, 110, 210 are coupled together, the facing end portions of each set of optical fibers 90 (e.g., the first set of optical fibers of the first MPO optical connector and the second set of optical fibers of the second MPO optical connector) are spaced apart from one another, due to the at least one of the connectors having the recess 126, 226.

Figure 15:
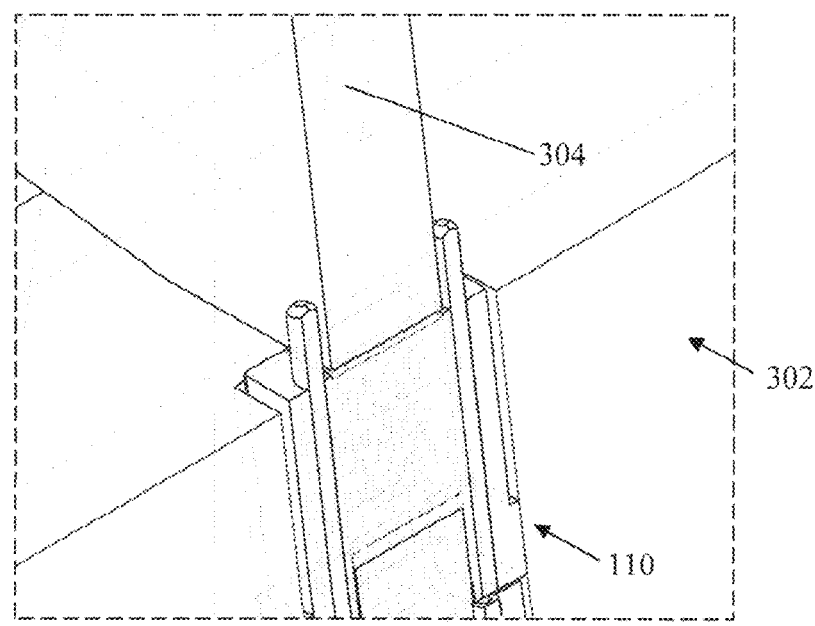
FIG. 15 is an enlarged fragment of FIG. 14, but with an MPO optical connector shown in longitudinal section.

Referring to FIGS. 13-17, one method of making the MPO optical connectors 110, 210 of the present disclosure will now be described. The method includes attaching the MPO optical connector 110, 210 to the end of the fiber optic cable 88. This step includes inserting or attaching the optical fibers 88 to the ferrule body 114, 214. Generally, each optical fiber 90 is inserted into a fiber channel of the ferrule body 114, 214 and secured in place with an epoxy. The optical fibers 90 are attached to the ferrule body 114, 214 such that the distal ends of the optical fibers are adjacent to, at or may even extend past the distal end of the ferrule body. After the MPO optical connector 110, 210 is attached to the fiber optic cable 88, the MPO optical connector is placed in a grinder jig 302 for grinding by a grinder 300. The grinder 300 forms (e.g., grinds) the recess 126, 226 in the MPO optical connector 110, 210. The grinder 300 includes a grinding wheel or disk 304 that forms the recess 126, 226. The grinder jig 302 may hold the MPO optical connector 110, 210 at an angle (such as about 8 degrees) to the vertical in order to form the angled proximal end 130, 230 of the recess 126, 226 (see FIG. 12). The grinder jig 302 may hold several MPO optical connectors 110, 120 at the same time and the grinder 300 may include several grinding disks 304 for grinder the MPO optical connectors. The grinder disk 304 grinds the MPO optical connector 110, 210 to form the recess 126, 226 (FIG. 15). The grinding disk 304 may grind away a portion of the ferrule body 114, 214 and/or distal portions of the optical fibers 90. The grinding occurs until the recess 126, 226 is near or at the prescribed or desired depth D. After the recess 126, 226 is formed, the distal ends of the optical fibers 90 may be polished to form a polished end face on the optical fibers. The polishing may set the final, desired depth D of the recess 126, 226.

Figure 16:
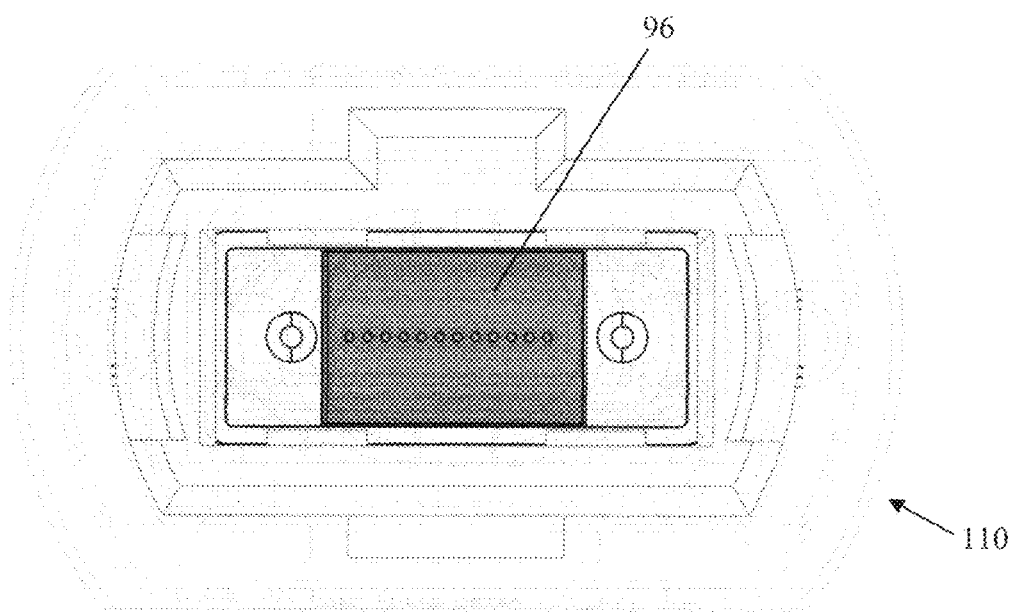
FIG. 16 is a schematic end view of the MPO optical connector.
Figure 17:
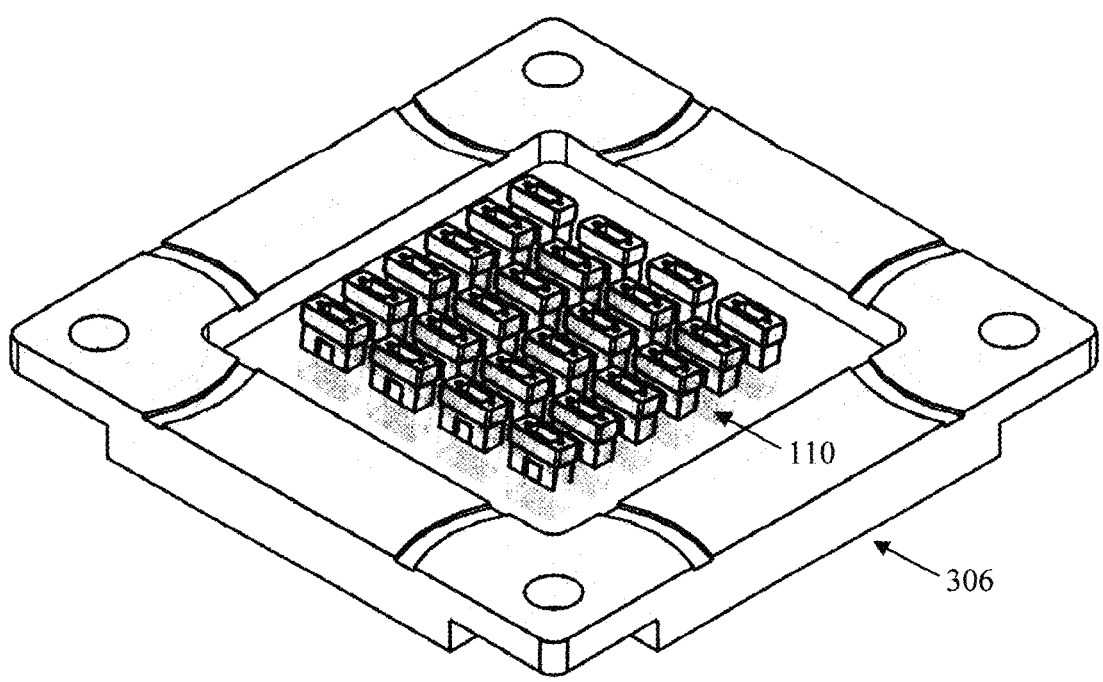
FIG. 17 is a perspective of a coating jig holding multiple MPO connectors.

Referring to FIGS. 16 and 17, after the recess 126, 226 is formed, the distal ends of the optical fibers 90 are coated with the anti-reflective material 96. In FIG. 16, the anti-reflective material 96 is indicated by the shaded region. The anti-reflective material 96 may be applied over the entire proximal end 130, 230 of the recess 126, 226 as shown. The MPO optical connector 110, 210 may be placed in a coating jig 306 for coating the MPO optical connector with the anti-reflective material 96. The coating jig 306 may hold several MPO optical connectors 110, 210 at the same time for the coating and includes a mask. As mentioned above, the anti-reflective material 96 helps minimize the insertion loss and reflection loss of the light signal transmitted between the coupled together MPO optical connectors 10, 11, 110, 210. After the coating of the anti-reflective material 96 is applied, the MPO optical connector 110, 210 is ready to be used.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A multi-fiber push on (MPO) optical connector comprising:
   a housing;
   a ferrule body supported by the housing, the ferrule body being configured to form an optical connection with a second MPO optical connector, the ferrule body including a connection end having a distal end face arranged to face the second MPO optical connector when the ferrule body forms the optical connection with the second MPO optical connector, the connection end of the ferrule body defining a recess extending proximally into the ferrule body from the distal end face;
   a plurality of optical fibers received in the ferrule body, distal ends of the optical fibers being disposed adjacent to a proximal end of the recess such that the distal ends of the optical fibers are spaced apart from the second MPO optical connector when the ferrule body forms an optical connection with the second MPO optical connector; and wherein
   an anti-reflective material coating is deposited on a distal end of the optical fibers to reduce optical losses,
   the ferrule body having an upper surface, a lower surface and opposite side surfaces extending between the upper and lower surfaces, a first distance between the upper and lower surfaces spanned by the opposite side surfaces being less than a width of the upper surface and the lower surface, the connection end of the ferrule body having a central region extending from the upper surface to the lower surface and opposite side regions extending between the upper and lower surfaces, the central region being defined by the recess.

2. The MPO optical connector of claim 1, wherein the side regions protrude distally of the central region and define the distal end face, the side regions being positioned to engage an end face of the second MPO optical connector to space the end face of the second MPO optical connector from the central region of the connection end of the ferrule body.

3. The MPO optical connector of claim 2, wherein the ferrule body further comprises channel openings at the side regions of the ferrule body and extending proximally into the ferrule body.

4. The MPO optical connector of claim 2 wherein the ferrule body further comprises mechanical transfer pins projecting distally from the side regions.

5. The MPO optical connector of claim 1, wherein the recess has a depth extending from the distal end face to the proximal end of the recess, the depth being configured to reduce the effect of at least one of insertion loss or reflection.

6. The MPO optical connector of claim 1, a refractive index of the anti-reflective material is configured to correspond to a refractive index of gap media disposed between the distal end of the optical fibers and the second MPO optical connector.

7. The MPO optical connector of claim 6, further comprising the gap media, wherein the gap media is one of air, gel or water.

8. A multi-fiber push on (MPO) optical connector comprising:
   a housing;
   a ferrule body supported by the housing, the ferrule body being configured to form an optical connection with a second MPO optical connector, the ferrule body including a connection end having a distal end face arranged to face the second MPO optical connector when the ferrule body forms the optical connection with the second MPO optical connector, the connection end of the ferrule body defining a recess extending proximally into the ferrule body from the distal end face;
   a plurality of optical fibers received in the ferrule body, distal ends of the optical fibers being disposed adjacent to a proximal end of the recess such that the distal ends of the optical fibers are spaced apart from the second MPO optical connector when the ferrule body forms an optical connection with the second MPO optical connector;

a gap media disposed between the distal end of the optical fibers and the second MPO optical connector, the gap media having a refractive index; and wherein an anti-reflective material coating is deposited on a distal end of the optical fibers to reduce optical losses;

wherein a refractive index of the anti-reflective material is less than the refractive index of the gap media.

9. A multi-fiber push on (MPO) optical connector assembly comprising:

a first MPO optical connector having a first ferrule body with a first end face and two pins extending from the first end face, the first MPO optical connector including a first set of optical fibers received in the first ferrule body;

a second MPO optical connector having a second ferrule body with a second end face and two guide channels configured to accept the two pins when the first and second MPO optical connectors are coupled together, the second MPO optical connector including a second set of optical fibers received in the second ferrule body;

wherein at least one of the first ferrule body or the second ferrule body defines a recess extending inward from the corresponding first or second end face such that facing end portions of the first and second sets of optical fibers are spaced apart from one another when the first and second MPO optical connectors are coupled together to form an optical connection between the first set of optical fibers and the second set of optical fibers; and further wherein a first anti-reflective material coating is deposited on a distal end of the first set of optical fibers to reduce optical losses and a second anti-reflective material coating is deposited on a distal end of the second set of optical fibers, wherein the recess is defined by the first ferrule body, the recess constituting a first recess extending inward from the first end face, and the second ferrule body defines a second recess extending inward form the second end face.

10. The MPO optical connector assembly of claim 9, wherein the ends of the first set of optical fibers are disposed in the first recess spaced from the first end face and the ends of the second set of optical fibers are disposed in the second recess spaced from the second end face.

11. The MPO optical connector assembly of claim 9, wherein the first recess is disposed between the two pins of the first MPO optical connector and the second recess is disposed between the two guide channels of the second MPO optical connector.

12. The MPO optical connector assembly of claim 9, wherein at least one of the first recess and the second recess has a depth selected to reduce the effect of at least one of insertion loss or reflection.

13. The MPO optical connector assembly of claim 9, wherein refractive indices of the first and second anti-reflective materials are configured to correspond to a refractive index of gap media disposed between the adjacent ends of the first and second sets of optical fibers when the first and second MPO optical connectors are coupled together.

14. The MPO optical connector assembly of claim 13, further comprising the gap media, wherein the gap media is one of air, gel or water.

15. A multi-fiber push on (MPO) optical connector assembly comprising:

a first MPO optical connector having a first ferrule body with a first end face and two pins extending from the first end face, the first MPO optical connector including a first set of optical fibers received in the first ferrule body;

a second MPO optical connector having a second ferrule body with a second end face and two guide channels configured to accept the two pins when the first and second MPO optical connectors are coupled together, the second MPO optical connector including a second set of optical fibers received in the second ferrule body;

wherein at least one of the first ferrule body or the second ferrule body defines a recess extending inward from the corresponding first or second end face such that facing end portions of the first and second sets of optical fibers are spaced apart from one another when the first and second MPO optical connectors are coupled together to form an optical connection between the first and second optical fibers; and further wherein a first anti-reflective material coating is deposited on a distal end of the first set of optical fibers to reduce optical losses and a second anti-reflective material coating is deposited on a distal end of the second set of optical fibers, the recess is defined in the first ferrule body, the recess constituting a first recess extending inward from the first end face, and the second ferrule body defines a second recess extending inward form the second end face;

a gap media disposed between the distal end of the optical fibers and the second MPO optical connector, the gap media having a refractive index;

wherein a refractive index of the first anti-reflective material is less than the refractive index of the gap media and a refractive index of the second anti-reflective material is less than the refractive index of the gap media.

16. The MPO optical connector assembly as set forth in claim 9 wherein the first face of the first ferrule body and the second face of the second ferrule body are free of a reflective film.

17. The MPO optical connector of claim 1 wherein the connection end of the ferrule body is free of a reflective film.

* * * * *